United States Patent [19]
Shaffer et al.

[11] Patent Number: 5,266,735
[45] Date of Patent: Nov. 30, 1993

[54] MUSIC TRAINING INSTRUMENT AND METHOD

[75] Inventors: John R. Shaffer, 752 Charcot Ave., San Jose, Calif. 95131; Craig Bradley, San Jose, Calif.

[73] Assignee: John R. Shaffer, San Jose, Calif.

[21] Appl. No.: 985,250

[22] Filed: Dec. 2, 1992

Related U.S. Application Data

[63] Continuation of Ser. No. 732,495, Jul. 18, 1991, abandoned.

[51] Int. Cl.⁵ .................. G10G 1/00; G10G 1/02
[52] U.S. Cl. ........................ 84/609; 84/602; 84/645; 84/649; 84/464 A; 84/470 R; 84/485 R
[58] Field of Search ........ 84/464 R, 464 A, 470 R, 84/477 R, 478, 485 R, 601, 609, 644, 645, 649

[56] References Cited

U.S. PATENT DOCUMENTS

| | | | |
|---|---|---|---|
| 4,466,324 | 8/1984 | Okamoto et al. | 84/470 R |
| 4,480,521 | 11/1984 | Schmoyer | 84/478 |
| 4,694,723 | 9/1987 | Shinohara et al. | 84/478 |
| 4,791,848 | 12/1988 | Blum, Jr. | 84/485 R |
| 4,915,005 | 4/1990 | Shaffer et al. | 84/485 R |
| 5,040,447 | 8/1991 | Murata et al. | 84/477 R |
| 5,074,182 | 12/1991 | Capps et al. | 84/609 |

OTHER PUBLICATIONS

Mulhern, Tom "Product Profiles–Optek Fretlight FG-100 Guitar," Guitar Player/Jan. 1990, p. 134.

*Primary Examiner*—William M. Shoop, Jr.
*Assistant Examiner*—Helen Kim
*Attorney, Agent, or Firm*—Townsend and Townsend Khourie and Crew

[57] ABSTRACT

An improved method and apparatus for learning to play a musical instrument retrieve a stored sequence of musical notes and other data from a source, and determine locations on the musical instrument corresponding to the sequential music data from the source, and then indicate to the user upon the musical instrument the locations thereon where the instrument should be engaged to produce the note or chord to be played in the sequence.

17 Claims, 3 Drawing Sheets

MUSIC TRAINING INSTRUMENT AND METHOD

This is a continuation of application Ser. No. 07/732,495, filed Jul. 18, 1991, now abandoned.

BACKGROUND OF THE INVENTION

1. Field of the Invention

The present invention relates to musical instruments, and more particularly to an improved musical instrument for aiding a person to learn musical compositions by playing the instrument following visual cues provided by the instrument.

2. Description of the Related Art

Dynamic note indicating music devices, like the player piano, are limited in their capabilities of aiding a person to learn how to play a musical instrument because the user does not play the notes himself. At best, the user may attempt to follow the fingerings generated by the device. In addition, these instruments lack the ability to receive musical data from sources external to the instrument.

To help a person learn to play a musical instrument, the instrument ideally would allow the user to generate music with the instrument after receiving real-time, easy to follow cues on the musical instrument. Much of the music desired to be learned would include single notes and chords, to be played together simultaneously and in sequence. Additionally, this music would include pauses, or rests, as well. A useful learning device would visually assist the user by dynamically displaying playing locations on the musical instrument at the desired tempo of one or more notes simultaneously from a musical composition desired to be learned. Such a method would allow the user to more easily learn to play the predetermined sequence.

U.S. Pat. No. 4,915,005 to Shaffer et al. discloses a fingering display for a musical instrument. After the user selects a musical key and scales, notes, or chords, the instrument statically displays those corresponding locations on the musical instrument where the user should engage it to play those desired notes. The notes displayed are limited to those stored in the registers and correspond to a selected key. Thus, the disclosed device does not dynamically display sequences of notes, and cannot receive musical data from an external source.

SUMMARY OF THE INVENTION

The present invention provides a learning system and associated apparatus capable of aiding the user to learn a sequence of notes, chords and other groups of notes by playing that sequence of notes indicated upon the musical instrument. For example, the sequence of notes may be a song or an instructional lesson. The method and apparatus of the present invention retrieve musical data stored in a predefined order, determine the locations on the musical instrument corresponding to selected notes of the retrieved musical data, and indicate to the user the determined locations on the musical instrument corresponding to the stored musical data. The musical data sequence may include data representing musical notes, tempo, and musical key. The apparatus includes a display and a controller having an input port for receiving musical data.

By having the user see and play a sequence in a predetermined order, the user is more likely to quickly learn and remember that sequence. The user may alter the note indication rate, or tempo, to help the user learn the sequence more easily. The invention preferably includes the step of providing an audio output independent of the musical instrument corresponding to the notes to be played by the user in order to provide additional sensory cues. The pitch of the notes produced by the audio output is maintained regardless of tempo. In addition, the invention provides an open structure for retrieval of the note sequences from its input port. The controller may be coupled to a standard Musical Instrument Digital Interface (MIDI) for computer controlled music data compatibility.

DESCRIPTION OF THE PREFERRED EMBODIMENT

Figure 1:
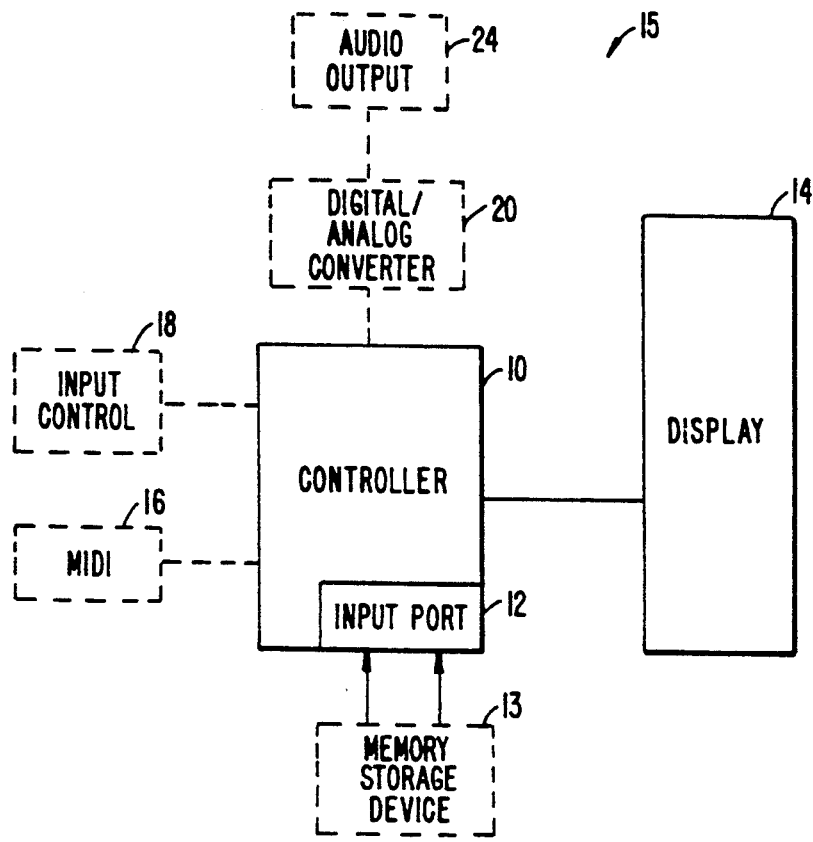
FIG. 1 is a block diagram illustrating the musical instrument according to the present invention.

Referring now to FIG. 1, the main structural components of the improved musical instrument learning system 15 of the present invention include a display 14 and a controller 10 having an input port 12 for receiving musical data. The musical data may be stored in interchangeable memory storage devices 13. Preferably, the apparatus further includes several devices connected to the controller including a MIDI 16, a user input control 18, and a digital to analog converter 20 for providing audio output signals from the stored digital musical data.

Figure 2:
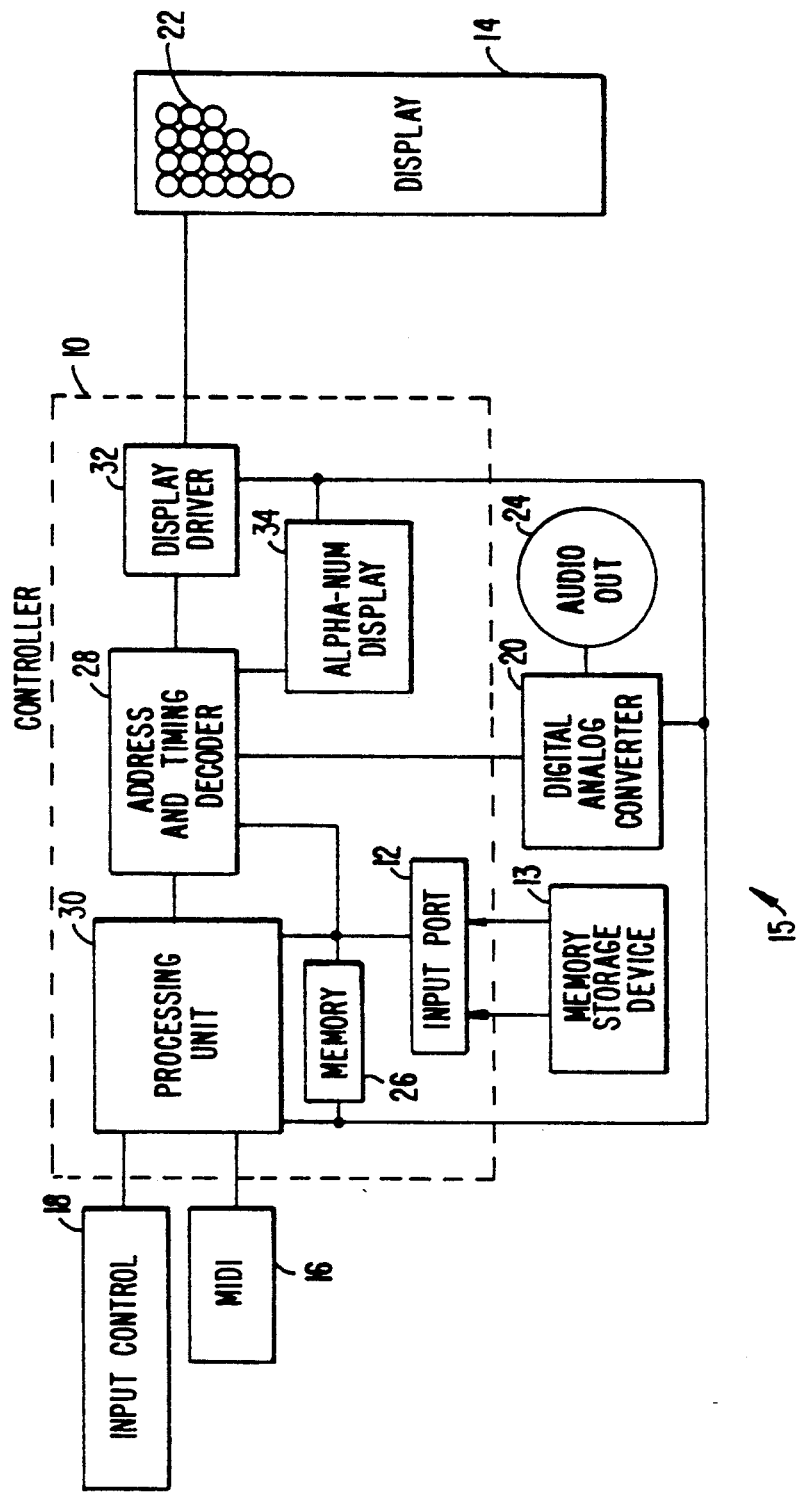
FIG. 2 is a block schematic diagram of one preferred embodiment of the present invention.

Referring now to FIG. 2, the display 14 of the apparatus is preferably an individually addressable Light Emitting Diode (LED) matrix 22. In the case of a guitar, the LED matrix 22 is mounted in a fingerboard in close registration with the strings. Signals from the controller 10 are supplied to the display via a display driver 32 which illuminates the individual LEDs based upon the address signals generated by a processing unit 30 and an address and timing decoder 28.

In one form, a switch may serve as the input control 18 but other user interface devices such as an alphanumeric keyboard, a mouse controller, or a joystick may also be used. The input control 18 is connected to the processing unit 30 for interrupting on-going processes and selecting the processing modes. Mode information may be presented either on the LED matrix 22 located on the instrument at the potential fingering locations operated as a dot-matrix display, or by a separate alphanumeric display 34.

The controller 10 contains the processing unit 30, which may comprise a conventional microprocessor. The address and timing decoder 28 interprets display address information from the processing unit 30 for the display 14. In addition, the address and timing decoder 28 provides timing signals for interfacing the memory 26, input port 12, display driver 32, digital to analog converter 20, and processing unit 30.

The controller additionally includes memory 26, including both Read Only Memory (ROM) and Random Access Memory (RAM). The ROM stores the program instructions for the operation of the apparatus while the RAM temporarily stores data for the execution of the program. The MIDI 16 is connected to a serial input of the processing unit 30. A digital to analog converter 20 receives digital signals representing musical sound information from the MIDI 16 or the input port 12 and converts the signals for the analog audio output 24. Pitch of an audio output note is the same for all tempos.

Figure 3:
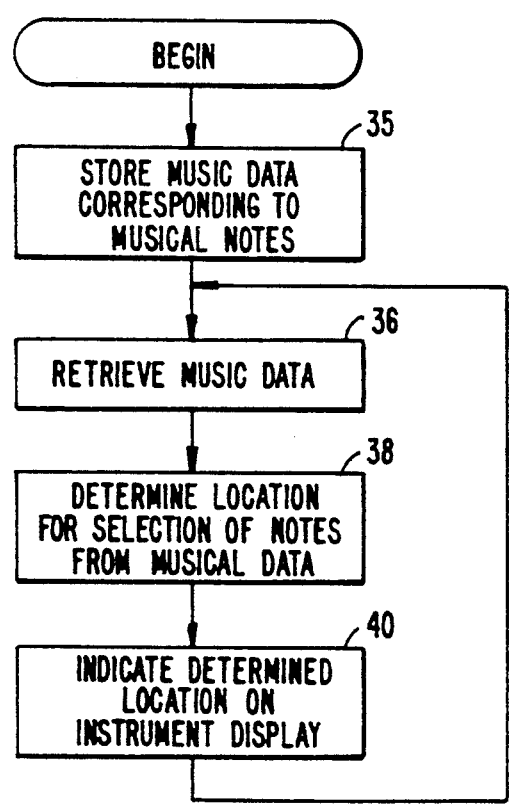
FIG. 3 is a flow chart illustrating the operation of the apparatus of FIG. 1.

Referring now to FIG. 3, the method of the present invention for visually assisting a person to learn how to play a musical instrument begins with the controller 10 retrieving 36 musical data of a sequence stored 35 in a predetermined order through the input port 12 or MIDI 16. Interchangeable memory storage devices 13 which store the musical data may be connected to the input port 12. Then, the processing unit 30 determines 38 a location on the musical instrument corresponding to the musical data. The display 14 indicates 40 to the user, in one preferred embodiment on the LED matrix 22, the determined location where the user should physically engage the instrument in order to produce the corresponding notes.

Figure 4:
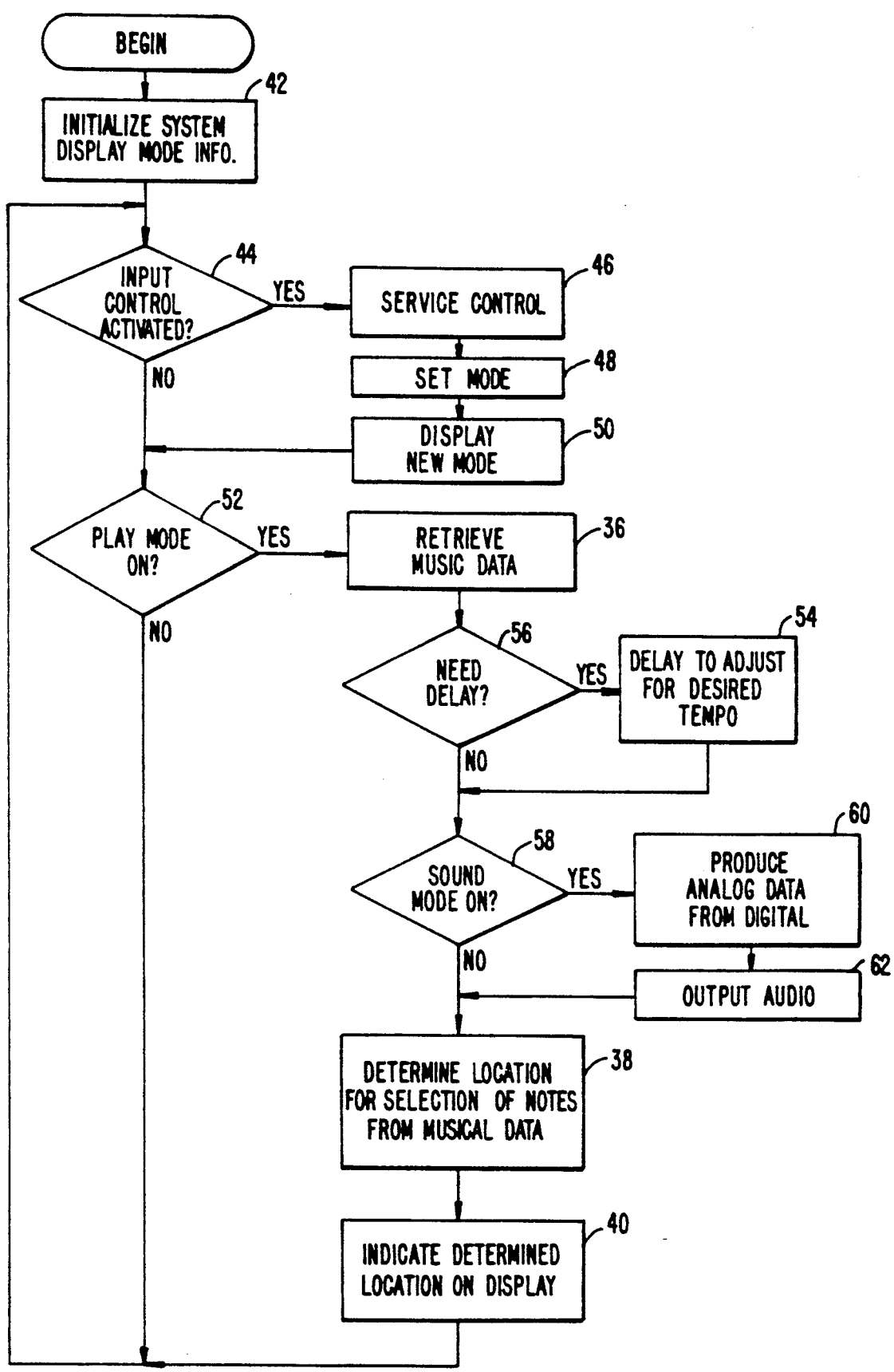
FIG. 4 is a flow chart illustrating the operation of the embodiment of the present invention that is illustrated in FIG. 2.

Referring now to FIG. 4, the preferred embodiment of the method for visually assisting a person to learn how to play a musical instrument begins by initializing the apparatus 15 and displaying the mode information 42 on the LED matrix 22 operated as a dot-matrix display 14 or on a separate alphanumeric display 34. The processing unit 30 checks if the input control 18 has been activated 44. If the input control 18 is activated, then the processing unit 30 in conjunction with the address and timing decoder 28 produces an output signal for the LED dot-matrix display 14 or the separate alphanumeric display 34 to indicate the configuration mode settings. The mode indications are changed corresponding to user input control manipulation 50 and subsequent processing unit 30 mode changes.

The processing unit 30 then checks its registers for whether the play mode is on 52. If the play mode is on, then the processing unit 30 retrieves 36 selected music data from the memory storage device 13 through the input port 12 or the MIDI 16 and places the music data into the memory 26. The music data may include notes, groups of notes, chords, and intentional predetermined musical pauses, or rests. The processing unit 30 checks its registers as to whether delay is needed 56 to adjust the timing of the playing location indications to produce the desired playing tempo. If delay is necessary to have more time between indications on the display 14, then the processing unit 30 waits a sufficient time between successive fingering indications to correspond to the desired tempo 56.

Next, the processing unit 30 checks its registers as to whether the sound mode is on 58. If the sound mode is on, the digital to analog converter 20 produces an analog output signal 60 based upon the digital music data retrieved 36. The analog sound is output 62 through the audio output 24 of the instrument. Even if the tempo is altered, the original analog audio output pitch is maintained. The processing unit 30 determines 38 a location on the musical instrument corresponding to the musical data. The LED matrix 22 indicates 40 to the user the determined location on the instrument where the user should physically engage to produce the corresponding notes on the instrument. These steps continue until there is no more music data to retrieve or until the play mode is set to off with the input control 18.

In summary, the present invention of a musical training instrument includes both a method and an apparatus. The method consists of the steps of storing 35 a predetermined sequence of musical data, retrieving 36 a segment of the musical data, determining 38 a location on the musical instrument corresponding to the where the user should physically engage the instrument to produce a notes, group of notes, or chord, and indicating 40 to the user the location where the user should physically engage the instrument to produce the note, group of notes, or chord corresponding to the stored musical data sequence.

The apparatus of the present invention includes a controller 10 and a display 14. The display 14 has multiple indicators located in close proximity such that the indicators signal the locations where the user should physically engage the instrument to produce the notes, group of notes, or chords which correspond to the stored sequence of musical data. The controller 10 regulates the individually addressable indicator display 14 to illuminate those locations where the user should physically engage to produce the sequence.

We claim:

1. A method for visually assisting a user to play a stringed musical instrument, said method comprising the steps of:
   storing a musical data sequence, arranged in a predetermined order, in a data storage medium, where said musical data includes data representing musical notes;
   inputting a segment of said musical data sequence in its predetermined order from said data storage medium into a controller mounted in said musical instrument;
   determining by means of said controller a location on the musical instrument corresponding to musical data where the user should physically engage the instrument to produce a selection of musical notes by vibration of at least one string;
   dynamically indicating to the user upon the musical instrument the determined location at which the user should engage the instrument in order to produce notes in the sequence corresponding to the selection of musical notes in the stored musical data; and
   producing a vibration in at least one string of said instrument to generate a musical tone.

2. The method according to claim 1, wherein said selection of musical notes may comprise at least one of notes, chords, and rests.

3. The method according to claim 1, wherein said musical data may comprise at least one of notes, chords, scales, compositions, and songs.

4. The method according to claim 1 comprising the additional step of controlling the rate at which the sequence of notes is indicated.

5. The method according to claim 1 comprising the additional step of selecting a segment of the sequence to be retrieved and determined and indicated.

6. The method according to claim 1 comprising the additional step of audibly producing the notes independently of the notes produced on the instrument by the vibration of said string.

7. A stringed musical instrument providing visual user assistance, said instrument comprising:
   a body and means mounted to the body for engaging the strings;
   at least one string attached to the body for producing a musical tone, said tone produced at least partially by vibration of the string;

display means including a plurality of individual annunciators for dynamically indicating a location on the engaging means at which the user should physically engage the musical instrument to produce a note; and means mounted in the body for reading data from a data storage medium, said data storage medium storing musical data representative of a selection of musical notes to be played on the musical instrument in a sequence; and controller means mounted in the body and having an input port coupled to the reading means for receiving said musical data, said controller analyzing musical data received at said input port to supply actuating signals to selected ones of the annunciators of the display means in the sequence.

8. The musical instrument according to claim 7 further comprising input control means coupled to the controller means for producing control signals in response to user manipulation of said input control means, said control signals comprising mode settings selected from the group consisting of sound settings, music data segment settings, tempo settings and display settings.

9. The musical instrument according to claim 7 wherein said musical instrument is a guitar and said engaging means comprises a fingerboard.

10. The musical instrument according to claim 7 wherein said musical instrument is a piano and said engaging means comprises a keyboard.

11. The musical instrument according to claim 10 wherein said plurality of annunciators are located in keys of the piano.

12. The musical instrument according to claim 7, wherein said musical data corresponding to musical notes may comprise at least one of notes, chords, and rests.

13. The musical instrument according to claim 7 comprising a plurality of interchangeable memory devices having a port for coupling with said input port of said controller.

14. The musical instrument according to claim 7, wherein said controller comprises a conventional microprocessor.

15. The musical instrument according to claim 7 comprising a Musical Instrument Digital Interface coupled to the input port of the controller for receiving standardized computer controlled music data.

16. The musical instrument according to claim 7 comprising a digital to analog converter and an audio output for audibly producing the notes of said musical data independently of the notes produced on the instrument by the vibration of said string.

17. The musical instrument according to claim 7 wherein said plurality of annunciators are disposed on a fingerboard of the stringed instrument, said plurality of individual annunciators in close registration with the strings of the instrument.

* * * * *